United States Patent [19]

King

[11] 4,178,259

[45] Dec. 11, 1979

[54] DISPERSANT MANNICH BASE COMPOSITIONS

[75] Inventor: John M. King, San Rafael, Calif.

[73] Assignee: Chevron Research Company, San Francisco, Calif.

[21] Appl. No.: 901,919

[22] Filed: May 1, 1978

[51] Int. Cl.$^2$ ............................................. C10M 1/54
[52] U.S. Cl. .................................. 252/42.7; 252/47.5; 252/51.5 R; 260/570.5 P
[58] Field of Search ................. 252/42.7, 47.5, 51.5 R; 260/570.5 P

[56] References Cited

U.S. PATENT DOCUMENTS

| | | | |
|---|---|---|---|
| 2,353,491 | 7/1944 | Oberright | 252/42.7 X |
| 3,368,972 | 2/1968 | Otto | 252/47.5 |
| 3,586,629 | 6/1971 | Otto et al. | 252/42.7 |
| 3,736,357 | 5/1973 | Piasek et al. | 252/47.5 X |
| 3,741,896 | 6/1973 | Abbott et al. | 252/42.7 |
| 3,809,648 | 5/1974 | Hotten | 252/42.7 X |

*Primary Examiner*—Delbert E. Gantz
*Assistant Examiner*—Andrew Metz
*Attorney, Agent, or Firm*—D. A. Newell; L. L. Vaughan

[57] ABSTRACT

New Mannich bases and their alkaline earth metal salts are prepared by condensing formaldehyde and a polyamine with a sulfur-containing phenolic mixture consisting of (1) from 5 to 40% of a sulfurized alkylphenol; and (2) from 95 to 60% of phenol alkylated with polyisobutene of 16 to 128 carbon atoms or a mixture of said phenol alkylated with polyisobutene and phenol alkylated with a propylene tetramer. They are useful as additives for lubricating oils, particularly for use in marine cylinder lubricating oils.

8 Claims, No Drawings

DISPERSANT MANNICH BASE COMPOSITIONS

BACKGROUND OF THE INVENTION

This invention relates to novel Mannich bases and their uses as lubricating oil additives.

For a variety of reasons, higher-sulfur-content fuels are now being used, particularly in marine engines. This high sulfur content leads to the formation in the presence of oxygen of corrosive sulfur acids, particularly sulfuric acid. To prevent damage to the engine from these sulfur acids, they must be neutralized with a basic material. This basic material is ordinarily an additive in the oil used to lubricate the engine. As higher-sulfur-content fuels are used, a greater and greater reservoir of alkalinity must be included in the lubricating oil to neutralize the acids. However, using conventional additives, such as calcium phenates, an increase in the amount of additive leads to an increase in ash formation, which is detrimental to the engine.

It is an object of this invention to provide a lubricating oil additive which is effective in neutralizing sulfur acids. It is a further object of this invention to provide a lubricating oil additive which is also an effective dispersant. It is an additional object of this invention to provide an additive which can neutralize large quantities of these acids with lower resultant ash formation than for conventional additives.

SUMMARY OF THE INVENTION

The Mannich bases and their alkaline earth metal salts of this invention are prepared from formaldehyde, a polyamine and a sulfur-contining phenolic mixture consisting of (1) from 5 to 40% of a sulfurized alkylphenol; and (2) from 95 to 60% of phenol alkylated with polyisobutene of 16 to 128 carbon atoms or a mixture of said phenol alkylated with polyisobutene and phenol alkylated with a propylene tetramer. These Mannich bases and their salts are useful as lubricating oil additives.

DETAILED DESCRIPTION OF THE INVENTION

Component 1 of the sulfur-containing phenolic mixture is an oil-soluble sulfurized alkylphenol. These materials are well known for use in lubricating oils. They usually contain from 4–20 weight percent sulfur and usually 8–18 weight percent sulfur. They can be prepared by combining phenol substituted with at least one alkyl group of about 8 to 130 carbon atoms and sulfur in the presence of calcium oxide. For the most part, these sulfurized alkylphenols can be described by the formula

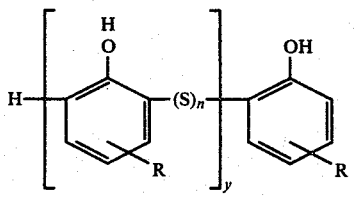

wherein R is a $C_8$–$C_{130}$ alkyl, n is an integer from 1 to 8, predominantly 1 to 2, and y is an integer from 1 to 9. A preferred sulfurized alkylphenol contains from 8 to 36 carbon atoms in the alkyl portion of the molecule. A convenient method for preparing these sulfurized alkylphenols is disclosed in U.S. Pat. No. 3,741,896, the disclosure of which is hereby incorporated by reference.

The starting component prepared by alkylating phenol with propylene tetramer is well known in the art. It is also known as tetrapropenyl phenol or dodecylphenol.

The starting component prepared by alkylating phenol with a polyisobutene of 16 to 128 carbon atoms can be readily prepared from commercially available material by methods well known in the art. Useful polyisobutenes are available from Chevron Chemical Company.

Preferred polyisobutenes are those with an average of 32 to 100 carbon atoms.

While the product of this invention can be prepared by using the sulfurized alkylphenol and either polyisobutenyl phenol or a mixture thereof with tetrapropenyl phenol as starting materials, the preferred product is prepared from a mixture of sulfurized alkylphenol, tetrapropenyl phenol and polyisobutenyl phenol. When such a mixture of alkylphenols is used, any ratio of polyisobutenyl phenol to tetrapropenyl phenol can be used. Preferably the mixture will contain from 95 to 30% phenol alkylated with propylene tetramer and 5 to 70% phenol alkylated with polyisobutylene.

The percent of each phenolic component from groups 1 and 2 used in the phenolic mixture is based on the phenol equivalents (calculated from the measured hydroxyl number) of each.

The polyamines used in preparing the novel compositions of this invention are the well-known ethylene amines, specifically ethylene diamine, diethylene triamine, triethylene tetraamine, tetraethylene pentamine, and pentaethylene hexamine. These compounds are usually prepared by the reaction of an alkylene chloride with ammonia. This reaction yields a somewhat complex mixture of alkylene amines, including some cyclic condensation products. These mixtures are also included within the scope of the term "polyamine."

Also included within the scope of the term "polyamine" are those amines prepared by reaction of acrylonitrile with an ethylene amine as described above, or with an amine of the formula $H_2N$-$(CH_2)_x NH_2$ where x is 3-6, followed by the reduction of the resultant intermediate. For example, the product prepared from ethylene diamine and acrylonitrile would be $H_2N$-$(CH_2)_3 NH$-$(CH_2)_2 NH$-$(CH_2)_3 NH_2$. Preferred polyamine for use in this invention is diethylene triamine.

The Mannich bases of this invention can be prepared by conventional methods as described in the art. It is preferred to prepare the Mannich bases by reacting 1 mol of the sulfur-containing phenolic mixture with 0.5–0.85 mol formaldehyde and at least 0.3 mol of polyamine. The reaction is carried out at a temperature of 25°–140° C., preferably 25°–130° C., and in the presence of a suitable solvent, such as benzene or toluene, which can be recovered from the reaction product. If desired, the reaction may be carried out in a mineral lubricating oil and the condensation product recovered as a lubricating oil concentrate.

Alkaline earth metal salts of the Mannich bases of this invention are particularly useful as lubricating oil additives. Preferred alkaline earth metal salts are calcium and magnesium.

The alkaline earth metal salts of the Mannich bases are prepared by using conventional methods, for example by treating the Mannich base with a source of alkaline earth metal cations, e.g. oxide (calcium oxide) or hydroxide (calcium hydroxide) or magnesium methoxide, in the presence of a promoter, such as water, ethylene glycol, butyl cellosolve, propylene glycol, 1,3-butylene glycol, methylcarbitol, diethanol amine, N-methyldiethanol amine, dimethyl formamide, N-methyl acetamide, or dimethyl acetamide. Preferred promoters are water, ethylene glycol and dimethyl acetamide. Most preferred is ethylene glycol. The reaction is carried out at 100°–175° C. After the reaction is completed, the product is stripped at a higher temperature, such as 175°–202° C. and at reduced pressure, for example 20 mm Hg, to remove any unreacted low-molecular-weight polyamines, such as ethylene diamine and diethylene triamine, and other volatile components.

The Mannich bases and their alkaline earth metal salts of this invention provide a high-alkalinity-value source of base for lubricating oil formulations. The alkaline earth metal salts provide a particularly high alkalinity value at a lower ash content than is present in conventional dispersants and acid neutralizers used in lubricating oil additives, and particularly in marine cylinder lubricating oils.

Alkalinity value is one method of specifying the degree of overbasing the phenate portion of Mannich base. It is also a measure of the acid-neutralizing properties of the compound. The method for determining the alkalinity value of a composition is set forth in ASTM Method D-2896. Briefly, the alkalinity value is the total base number given as milligrams of potassium hydroxide per gram of sample. It is the quantity of perchloric acid expressed in terms of equivalent number of milligrams of potassium hydroxide that is required to neutralize all basic constituents present in one gram of sample. For example, if a composition has the same acid-neutralizing capacity per gram as 10 mg of potassium hydroxide, the composition is given an alkalinity value of 10. The lower limit of alkalinity value is 0 for a neutral phenate. Values of 200–260 are especially desirable for use in lubricants which are exposed to the decomposition products of sulfur-containing diesel fuels. Further, the high alkalinity value is achieved with a lower amount of ash from the calcium salt for the products of this invention that sould be present if conventional metal phenate additives were used.

Lubricant compositions are prepared by admixing, using conventional techniques, the appropriate amount of the Mannich base or its alkaline earth metal salt with a lubricating oil. The selection of the particular base oil depends on the contemplated application of the lubricant and the presence of other additives. Generally, the amount of the Mannich base or the alkaline earth metal salt thereof used in the lubricating oil will vary from 0.1 to 40% by weight, and preferably from 3 to 35% by weight.

The lubricating oil which may be used in this invention includes a wide variety of hydrocarbon oils, such as naphthenic bases, paraffin bases and mixed base oils. The lubricating oils may be used individually or in combination and generally have a viscosity which ranges from 50 to 5000 SUS and usually from 100 to 1500 SUS at 38° C.

In many instances, it may be advantageous to form concentrates of this Mannich base or the alkaline earth metal salts thereof within a liquid carrier. These concentrates provide a convenient method of handling and transporting the additives of this invention before their subsequent dilution and use. The concentration of the Mannich base or the alkaline earth metal salt of the Mannich base within the concentrates may vary from 40 to 85% by weight, although it is preferred to maintain the concentration between about 50 and 70% by weight.

As desired, other additives may be included in the lubricating oil compositions of this invention. These additives include antioxidants or oxidation inhibitors, dispersants, rust inhibitors, anticorrosive agents, and so forth. Of particular interest are overbased sulfonates. Other types of lubricating oil additives which may be employed include antifoam agents, stabilizers, antistain agents, tackiness agents, antichatter agents, dropping-point improvers, antisquawk agents, extreme-pressure agents, odor-control agents, and the like.

EXAMPLES

Example A—Typical preparation of a sulfurized alkylphenol

Into a reaction vessel were introduced 18,100 parts of phenol alkylated with propylene tetramer, 750 parts of calcium oxide and 4620 parts of sulfur while the temperature of the mixture was maintained at 220° F. (104° C). The temperature was then raised to 265°–275° F. (130°–136° C.) and 580 parts of ethylene glycol charged. Hydrogen sulfide evolved and a low-rate nitrogen purge was maintained over the top of the reactor. The temperature was slowly raised to 335°–340° F. (169°–171° C.) and this temperature maintained for a period of 6 hours. The mixture was then cooled and the product isolated.

The following examples are presented to illustrate the practice of specific embodiments of this invention and should not be interpreted as limitations on the scope of the invention.

EXAMPLE 1

(a) A two-liter flask was charged with phenol (235 g, 2.5 mols), blanketed with nitrogen, and warmed to 45° C. Boron trifluoride (45 g) was added slowly. An additional 170 g of phenol was then added and the mixture stirred for 15 minutes at 45°–46° C.

(b) To 259 g of the above mixture was added 440 g (1 mol) polyisobutene (having an average of 32 carbon atomes per molecule and a number average molecular weight of 440) over a period of 15 minutes. The temperature of the reaction mixture increased to 72° C. and was then heated to 95° C. and maintained at this temperature for 3 hours. The mixture was cooled to 50° C. and washed once with 250 ml mixed hexanes and 200 ml water, twice with water, and then stirred with 100 ml of a 5% aqueous sodium bicarbonate solution. The mixture was again washed with water and then dried over magnesium sulfate. The mixture was filtered through glass wool and stripped to 189° C. at 0.8 mm Hg to yield 308 g of product having an equivalent weight of 529.

(c) A three-liter flask containing 250 g of diluent oil, 527 g (1.82 eq.) phenol alkylated with propylene tetramer, 308 g (0.58 eq.) phenol alkylated with polyisobutene [prepared in 1(b) above], and 255 g (0.6 eq.) sulfurized alkyl phenol (prepared as in Example A) was heated to 70° C. and 155 g (1.5 mols) diethylene triamine was added. After stirring for 10 minutes, 17 g of 95% paraformaldehyde (2.25 mols formaldehyde) was added. The mixture was heated to 125°–132° C. for 2 hours and then cooled to 100° C., at which time 93 g (1.5 mols) ethylene glycol was added. After stirring for 10 minutes, 111 g (1.5 mols) calcium hydroxide was added. The mixture was heated to 175°14 180° C. for 2 hours and then stripped to 202° C. at 20 mm Hg. Diluent oil (75 g) was added and the mixture filtered at 150° C. through diatomaceous earth. The product had an alkalinity value of 229, contained 3.06% N and 4.0% Ca, and had a viscosity of 5702 Saybolt Universal Seconds (SUS) at 99° C.

EXAMPLE 2

(a) A two-liter flask was charged with 191 g of a $BF_3$-phenol complex prepared as in Example 1, containing 10% $BF_3$ and 172 g (1.83 mols) phenol. The flask was heated to 50° C., under nitrogen, and 695 g (0.73 mols) polybutene (having an average of 24 carbons per molecule and a number average molecular weight of 950) was added dropwise over a period of 1.25 hours. The mixture was heated to 90° C. and then held for 3 hours at 83°–85° C. After standing overnight, the mixture was heated to 60° C. and 300 ml mixed hexanes and 200 ml warm water were added. The hexane phase was separated and washed two times with water. The product was then slurried at 50° C. with an aqueous bicarbonate solution, washed again with water and dried over magnesium sulfate. The product was filtered through glass wool and then stripped to 184° C. at 0.8 mm Hg to yield 550 g product having an equivalent weight of 748.

(b) To a three-liter flask containing 250 g diluent oil, 540 g (1.8 eq.) phenol alkylated with propylene tetramer, 225 g (0.6 eq.) sulfurized alkyl phenol (prepared as in Example A), 450 g (0.6 eq.) polyisobutene-alkylated phenol [prepared in 2(a) above], and 156 g (1.5 mols) diethylene triamine) at 70° C. was added 71 g (2.25 mols) of 95% paraformaldehyde. The mixture was heated to 130° C. for 1 hour, 80 g of additional diluent oil was added and the product was filtered through diatomaceous earth and then stripped to 200° C. at 0.1 to 0.2 mm Hg. The product had an alkalinity value of 225, contained 3.11% nitrogen and 3.11% calcium, and had a viscosity of 9919 SUS at 99° C.

EXAMPLE 3

Compounds of this invention were tested in lubricating oil compositions in the well-known 1-G Caterpillar test. In this test, a single-cylinder diesel engine having a 5¼" bore by 6½" stroke is operated under the following conditions: timing, °BTDC 8; brake mean effective pressure psi, 141; brake horsepower, 42; BTU's per minute, 5850; speed 1800 rpm; air boost 53" Hg absolute; air temperature in, 255° F. (124° C.); water out, 190° F. (88° C.); and sulfur in fuel, 0.4% by weight. At the end of each 12 hours of operation, sufficient oil was drained from the crankcase to allow addition of 1 quart of oil. In the test of the lubricating oil compositions of this invention, the 1-G test was run for 60 hours. At the end of this period, the engine was dismantled and rated for cleanliness. The ring lands are rated on a scale of 0 to 800, with 0 representing clean and 800 representing black deposits. The ring grooves are rated on a scale of 0 to 100% groove fill, with 0 representing clean. The underhead of the piston is rated on a scale of 0 to 10, with 0 representing dirty and 10 representing clean.

The base oil used in these tests is a Midcontinent base stock SAE 30 oil containing a sufficient amount of the additive being tested to give an alkalinity value of 10. The results are shown in Table I.

TABLE I

| | Caterpillar 1-G Test | | |
|---|---|---|---|
| Product of Example | Grooves | Lands | Under-head |
| 1 | 48.8-19.8-1.0-0.5 | 745-150-45 | 9.2 |
| 2 | 71-22.6-1.9-1.0 | 765-305-115 | 8.0 |

What is claimed is:

1. A lubricating oil additive selected from a Mannich base condensation product and the alkaline earth metal salts thereof, said Mannich base being prepared by condensing formaldehyde and a polyamine with a sulfur-containing phenolic mixture consisting of (1) from 5 to 40% of a sulfurized alkylphenol and (2) from 95 to 60% of phenol alkylated with polyisobutene of 16 to 128 carbon atoms or a mixture of said phenol alkylated with polyisobutene and phenol alkylated with a propylene tetramer.

2. The calcium salt of said Mannich condensation product of claim 1 wherein said polyisobutene contains 32 to 100 carbon atoms.

3. The magnesium salt of said Mannich condensation product of claim 1 wherein said polyisobutene contains 32 to 100 carbon atoms.

4. The additive according to claim 1 wherein component (2) consists of 95 to 30% phenol alkylated with propylene tetramer and 5 to 70% phenol alkylated with a polyisobutylene of about 16 to 128 carbon atoms.

5. A lubricating oil composition comprising an oil of lubricating viscosity and from 0.1 to 40% by weight of a lubricating oil additive according to claim 1, 2, 3 or 4.

6. A lubricating oil concentrate comprising from 15 to 60% by weight of an oil of lubricating viscosity and from 85 to 40% by weight of a lubricating oil additive according to claim 1, 2, 3 or 4.

7. A process for preparing a lubricating oil additive according to claim 1 which comprises condensing 0.5 to 0.85 mol formaldehyde, at least 0.3 mol of a polyamine, and 1.0 mol of a sulfur-containing phenolic mixture consisting of (1) from 5 to 40% of a sulfurized alkylphenol; and (2) from 95 to 60% of phenol alkylated with polyisobutene of 16 to 128 carbon atoms or a mixture of said phenol alkylated with polyisobutene and phenol alkylated with a propylene tetramer and, if the salt is desired, forming the alkaline earth metal salt by neutralizing with an alkaline earth metal oxide or hydroxide.

8. The product prepared according to the process of claim 7.

* * * * *